Jan. 26, 1937.     H. W. RUPPLE     2,069,098
METALWORKING MACHINE
Filed Oct. 2, 1933     5 Sheets-Sheet 1

INVENTOR:
HARRY W. RUPPLE
Kwio Hudson & Kent
ATTORNEYS

Jan. 26, 1937.                    H. W. RUPPLE                      2,069,098
                               METALWORKING MACHINE
                              Filed Oct. 2, 1933            5 Sheets-Sheet 4

INVENTOR:
HARRY W. RUPPLE
Kwis Hudson & Kent
ATTORNEYS

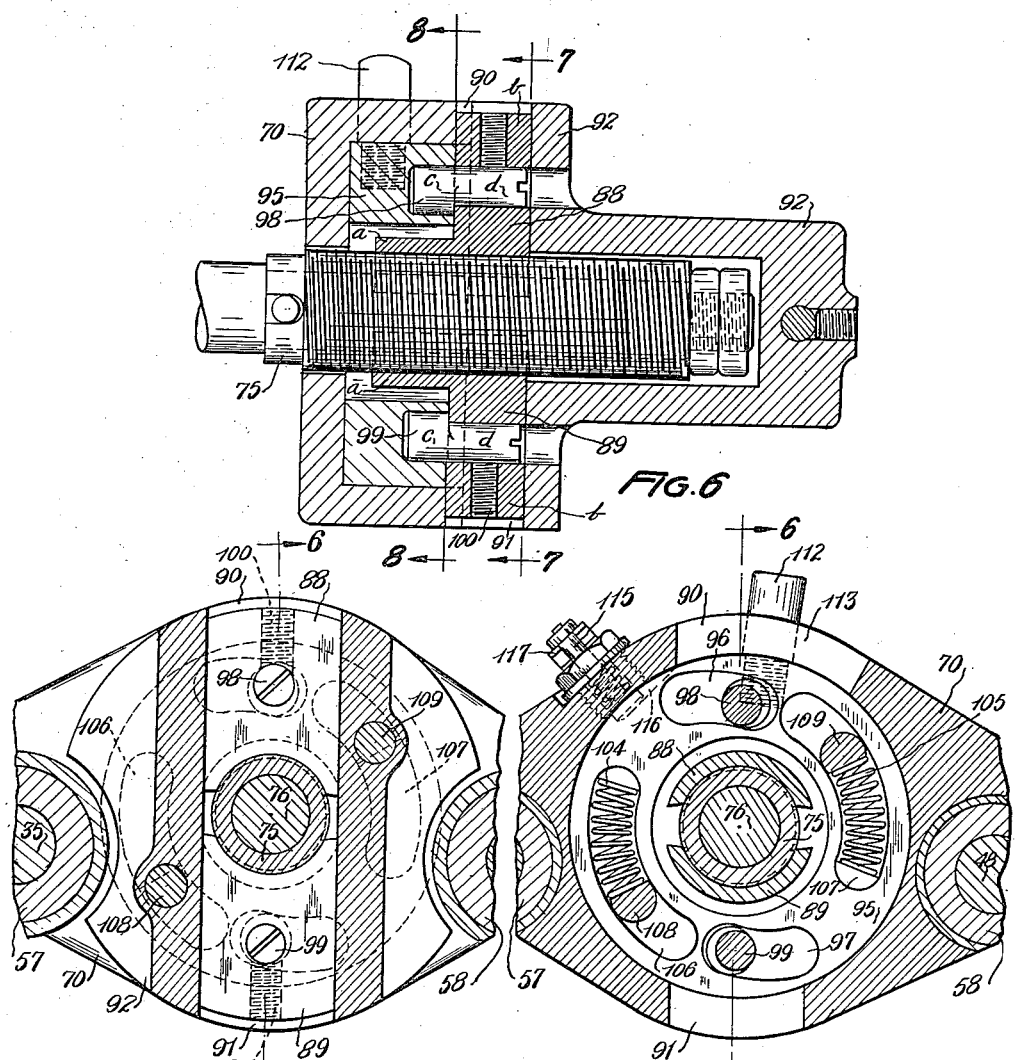

Patented Jan. 26, 1937

2,069,098

UNITED STATES PATENT OFFICE 2,069,098

METALWORKING MACHINE

Harry W. Rupple, Shaker Heights, Ohio, assignor to The Cleveland Automatic Machine Company, Cleveland, Ohio, a corporation of Ohio Application October 2, 1933, Serial No. 691,845

9 Claims. (Cl. 29—37)

The present invention relates to metal working machines and more particularly to automatic metal working machines of the multiple spindle indexible turret type of bar or rod machine commonly called "automatic screw machine" wherein a plurality of blanks or stock bar is intermittently fed through rotatable spindles supported in an indexible spindle turret and operated upon by tools located at a plurality of stations as the work is indexed from station to station. The tools are usually supported on tool slides and are moved in predetermined timed relation to the indexing of the turret and the feeding of the work blanks or bars.

An object of the present invention is the provision of a novel automatic metal working machine capable of cutting spaced threads on a blank or bar at a plurality of stations, which threads are preferably a continuation one of the other.

Another object of the invention is the provision of a novel automatic metal working machine of the character referred to above capable of cutting spaced threads on a blank or bar preferably supported in a rotatable spindle, at a plurality of stations, and which threads are preferably a continuation one of the other.

Other objects of the invention are the provision of a novel automatic machine of the type referred to above for making stay bolts from bar stock in which the opposite ends of the bolts are threaded by dies located at different stations before the bolt is severed from the stock bar, and the provision of novel means for controlling a plurality of dies located at different stations so that spaced threads of the same diameter may be cut on the end of a stock bar projecting from a work spindle, which threads are preferably a continuation one of the other.

Further objects and advantages of the invention will be apparent from the following description of the preferred embodiment of the invention described with reference to the accompanying drawings, in which Figure 1 is a front elevation of the tool portion of an automatic metal working machine embodying the present invention.

Fig. 6 is a section on the line 6—6 of Figs. 4, 7 and 8.

Fig. 7 is a section on the line 7—7 of Fig. 6, and

Fig. 8 is a section on the line 8—8 of Fig. 6.

Similar reference characters designate corresponding parts throughout the several views of the drawings, in which the invention is illustrated as embodied in a machine, the general characteristics of which are well known in the art and which per se do not form a part of the present invention.

Figure 1:
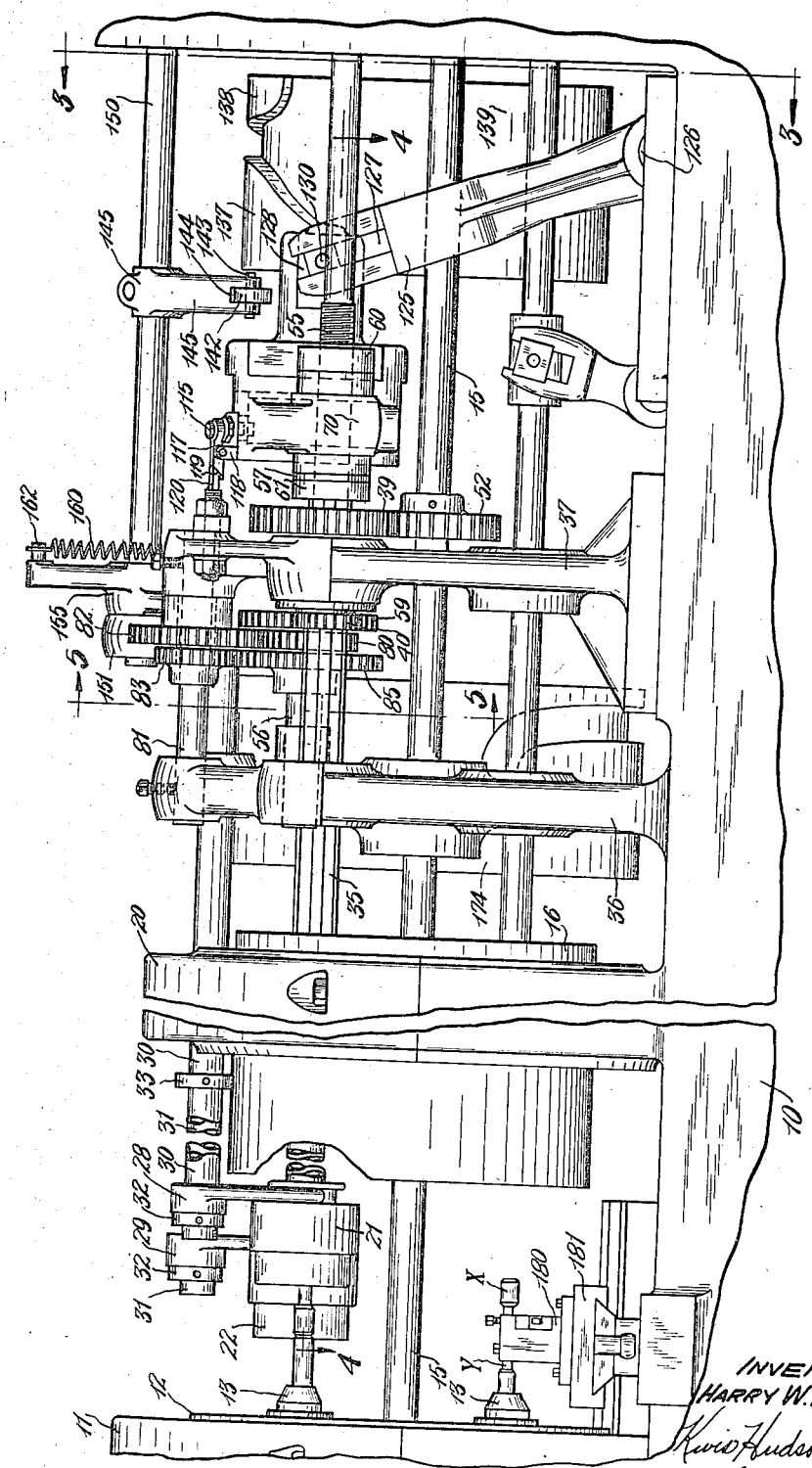

In machines of the type referred to the work, which may be in the form of bar stock or individual blanks, is carried in a plurality of rotatable spindles mounted in an indexible spindle turret equally spaced about the axis thereof, and the machining operations performed upon the ends of the stock projecting from the spindles by a plurality of tools supported upon movable carriages or slides adjacent the spindles. The tools adjacent each spindle are called a station and the work in any one spindle is indexed from station to station through a sequence of operations to form a finished blank. Preferably the work is in the form of bar stock and at one of the stations the finished blank is cut from the bar after which the bar is fed forward through the spindle in a manner well known in the art, and the cycle of operation repeated.

The feeding operation like the indexing operation is preferably controlled or actuated from a cam shaft of the machine and takes place in predetermined timed relation to the indexing operation and the other operations of the machine, and may take place before, during or after indexing as is well known in the art.

The present invention relates principally to the tool construction and operation at the various stations and only the tool portion of the machine is illustrated. The bed, spindle head and feeding mechanism etc. is omitted for the most part, only sufficient being shown to give a clear understanding of the invention, as these parts of the machine may be found embodied in a plurality of constructions well known in the art.

Referring to the drawings, the present invention is illustrated as embodied in what is commonly called a Cleveland machine, but it is to be understood that it is capable of embodiment in other machines with equal facility, and the particular construction shown is merely employed for the purpose of illustration and I do not wish to be limited thereto. The base of the machine illustrated is indicated in general by the reference character 10, and supports at one end thereof a spindle head 11 which rotatably supports the indexible spindle turret 12 carrying a plurality of spindles 13, in the present instance four equally spaced about the axis of the spindle turret. The spindles 13 may be of any well known construction adapted to have bar stock fed through the center thereof, and are rotated from a drive shaft 15 which projects through the tool slide 16 and extends into the spindle turret. The spindle turret 12 is automatically indexed periodically and the work fed through the centers of the spindles in predetermined timed relation thereto, by mechanism controlled or actuated from a cam shaft 18 in a well known manner. In the machine illustrated the cutting off and feeding operations preferably take place in one or both of the two lower stations, and threading mechanism, hereinafter described, is positioned at the two upper stations, adapted to cut spaced threads on the work blanks or bars as the same are indexed through the respective stations.

The tool slide 16 of conventional construction is slidably supported in the tool head 20 forming part of the frame 10 and is adapted to be reciprocated towards and from the spindle head in predetermined timed relation to the other operation of the machine in a manner well known in the art, by mechanism not shown. The drive shaft 15 and the cam shaft 18 are driven preferably in predetermined timed relation in any suitable manner.

Heretofore it was impossible to cut spaced threads of the same diameter and pitch on blanks carried in the spindles of an automatic screw machine, at different elevations by collapsible dies carried in alignment with the spindles, and particularly threads which were a continuation one of the other. In the present invention, which accomplishes such a result, the first or outer thread is cut on the extending end of the blank W by a collapsible die carried in one of the stations, as illustrated the upper front station, and the second or inner thread Y cut by another collapsible die at one of the following stations, as illustrated the upper rear station.

In the embodiment of the invention illustrated the two collapsible dies referred to above are indicated in general by the reference characters 21 and 22, and are rigidly secured to tubular members 23 and 24 slidably supported in suitable apertures 25 and 26 in the tool slide 16. The dies 21 and 22 are of conventional construction and are adapted to be opened and closed by shifting parts thereof, engaged by yoke members 28 and 29 slidably supported on rods 30 and 31, relative to fixed parts attached to the tubular members 23 and 24. The rods 30 and 31 are supported by the tool head 20 and are provided with adjustable stops 32 and 33 which limit the movement of the yoke members 28 and 29 along the same.

The tubular member 23 is slidably keyed to a splined shaft 35 rotatably supported in a bracket 36 formed integral with the frame 10, and a bracket 37 by means of a gear cone splined thereto, the gears 39 and 40 of which are on opposite sides of the bracket 37. The splined shaft 35 is telescoped within the tubular member 23 and a compression spring 41 positioned between a collar 42 secured to the end of the splined shaft 35 and a shoulder 43 on the interior of the tubular member 23, tends to keep the two parts in their collapsed position with the end of the splined shaft 35 abutting a stop 44 secured within the tubular member 23 by screws 45.

The tubular member 24 is detachably keyed to one end of a splined shaft 48 rotatably supported in the bracket 36, and the bracket 37 by means of a hub 49 of a gear 50 splined to said shaft. These splined shafts 23 and 24 and in turn the collapsible dies 21 and 22 are driven from the drive shaft 15 through a gear 52 keyed thereto and continuously in mesh with the gears 39 and 50.

The right hand ends of the splined shafts 35 and 48 are provided with threaded sections 55 and 56 upon which sleeve members 57 and 58 are slidably keyed and adjusted therealong and held in any adjusted position by nuts 60 and 61. The sleeve members 57 and 58 are rotatably secured in suitable apertures in a frame member 70 by anti-friction bearings 63. The frame member 70 carries a split nut designated in general by the reference character N adapted to engage a tubular lead screw 75 detachably secured to a short shaft 76 rotatably supported by the brackets 36 and 37, midway between the splined shafts 23 and 24 and above the drive shaft 15. The tubular lead screw 75 is removably supported on the shaft 76 so that the same can be replaced with lead screws of different pitch for cutting various pitched threads. The shaft 76 is driven from the gear 40, through change gears consisting of a gear cone comprising gears 79 and 80, rotatably supported on a tubular stub shaft 78 secured to the bracket 37 coaxial with the shaft 76, the former of which is in mesh with gear 40; a second gear cone comprising gears 82 and 83 rotatably supported on a short shaft 81 supported in the brackets 36 and 37 directly above the shaft 76, the former of which is in mesh with gear 80; and a gear 85 keyed to the shaft 76 and in mesh with gear 83.

The split nut N, as illustrated, consists of two sections 88 and 89 vertically reciprocable in suitable apertures 90 and 91 formed in the frame member 70 and a cap member 92 bolted or otherwise secured to said frame member. Each of the sections 88 and 89 comprises a semi-cylindrical part $a$ provided with interior threads and a rectangular part $b$ formed integral therewith and projecting at right angles thereto. The two sections 88 and 89 of the split nut are reciprocated towards and from the lead screw 75 by a cam member 95 rotatably supported in the frame member 70 and provided with cam grooves 96 and 97 into which pins 98 and 99 carried by the nut sections 88 and 89, respectively, project. The pins 98 and 99 comprise two cylindrical sections $c$ and $d$, eccentric to each other, the former of which engages in the cam slots and the latter in a suitable aperture in the nut sections. The particular construction of the pins 98 and 99 permits adjustment of the nut sections relative to the lead screw 75 and the cam member 95, and the pins are held in any adjusted position by set screws 100.

The cam member 95 is continuously urged in a clockwise direction, as viewed in Figs. 7 and 8, by compression springs 104 and 105 positioned in slots 106 and 107 formed in the cam member 95 and compressed between one end of said slots and stationary pins 108 and 109 respectively, secured in suitable apertures in the cap member 92. A pin 112 threaded into a tapped aperture in the cam member 95 and projecting through a slot 113 in the frame member 70 is adapted to be moved by mechanism, hereinafter described, in a counter-clockwise direction, as viewed in Figs. 7 and 8 to move the nut sections towards the lead screw and close the split nut N on the same.

The split nut N is held in its closed position by means of a spring pressed plunger 115 secured in the frame member 70 and adapted to engage in a detent 116 in the periphery of the cam member 95. The upper or exterior end of the spring pressed plunger 115 is engaged by one end of a lever 117 pivotally supported near the middle thereof by a bracket 118 secured to the frame member 70. The other end of a lever 117 is provided with a cam surface 119 adapted to engage a stationary cam member 120 adjustably secured to the bracket 37. The construction is such that after the dies 21 and 22, together with the shafts 35 and 48 and the frame member 70, have moved forward under the action of the lead screw the desired distance the cam surface 119 engages the cam member 120 raising the spring pressed plunger 115 until it clears the dent 116 permitting the split nut N to open under the action of the springs 104 and 105.

The frame member 70, together with the shafts 35 and 48 are moved in a reverse direction to retract the dies from the work by a double armed member 124 rotatably supported on a shaft 126 fixed in the frame 10. One arm 125 of the member 124 has a forked upper end provided with slots 127 in which rectangular blocks 128 and 129 rotatably supported on opposite ends of a pin 130 secured in the cap member 92 by a set screw 131 are slidably supported. The second arm 135 of the member 124 carries a cam roller 136 adapted to engage with cam plates 137 and 138 on a cam drum 139 supported on the cam shaft 18. In operation the dies 21 and 22 etc. are retracted from the work after the split nut N has opened by the mechanism just described in predetermined timed relation to the other operation of the machine.

Figure 4:
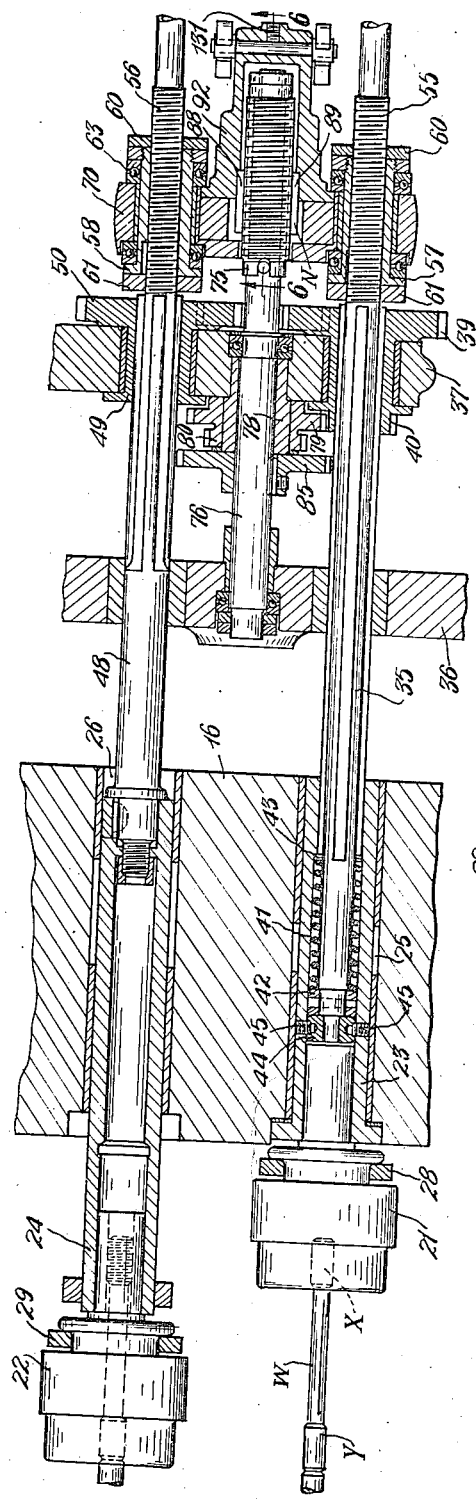
Fig. 4 is a section with portions in elevation on the line 4—4 of Fig. 1.
Figure 5:
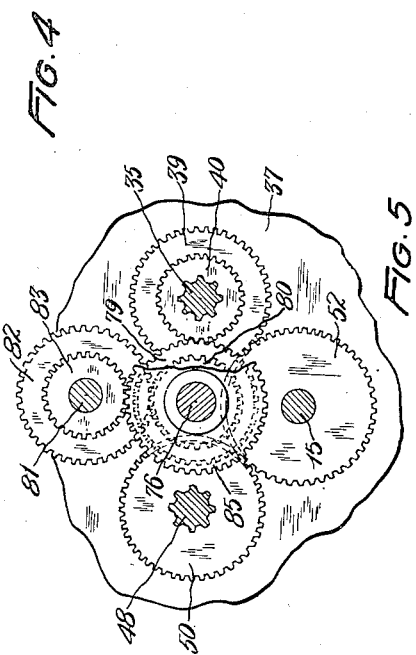
Fig. 5 is a section on the line 5—5 of Fig. 1.

A pawl 142 pivotally supported by means of a pin 143 in a slot 144 formed in the lower end of a lever 145 is adapted to engage the pin 112, when the dies are in a position to start cutting, and moves the same in a counter-clockwise direction as viewed in Figs. 4 and 8 to close the split nut N. A spring pressed or yieldable plunger 147 slidably supported in a suitable aperture in a projection 148 formed integral with the lever 145 engages the rear of the pawl 142 and permits a limited movement between said pawl and the lever 145 during the closing of the nut N.

The lever 145 is adjustable along a shaft 150 rotatably supported in a boss 151 formed on a rearward projection 152 of the bracket 37, and the right-hand end of the frame 10. The shaft 150 is adapted to be rocked or oscillated in predetermined timed relation to the other operations of the machine by means of a lever 155 fixed adjacent the center thereof to the shaft 150. The rear end 156 of the lever 155 carries a cam roller 157 adapted to engage a face cam 158 on the cam shaft 18. The roller 157 is held in engagement with the cam 158 by a tension spring 160 attached to a pin 161 secured in the front end 162 of the lever 155 and a pin 163 secured in the top of the bracket 37.

It will be apparent that a greater movement is required of the rear die 22 than the front die 21 to advance and retract the same over the work W, to perform the machining operation and clear the same for indexing, and that the same amount of movement could be given to both dies. But in an effort to reduce the overhang of the rear die 22 and keep the distance between the spindle and tool heads at a minimum the full movement of the rear die and the split nut is not imparted to the front die 21, only sufficient movement being given to the front die 21 to perform its machining operaton and clear the work for indexing, the remaining movement being taken up in the lost motion or telescopic connection between the tubular member 23 and the splined shaft 35.

In operation the front die 21 is opened when it reaches its forward position, by the engagement of the yoke 28 with the forward stop 32 and is closed at the end of its reverse movement by the engagement of the yoke 28 with the rear stop 33 both of which stops are stationary. But the operation of the rear die 22 is not so simple, because while it is open at the end of its forward movement it is desirable to have the same remain open during the return movement and a portion of the forward movement, that is until after it has cleared or moved over the first or outer thread $x$ on the work so as to permit a rapid traverse movement of the tools up to the working position and without any possibility of damaging the first or outer threads $x$ previously cut by the die 21.

Figure 2:
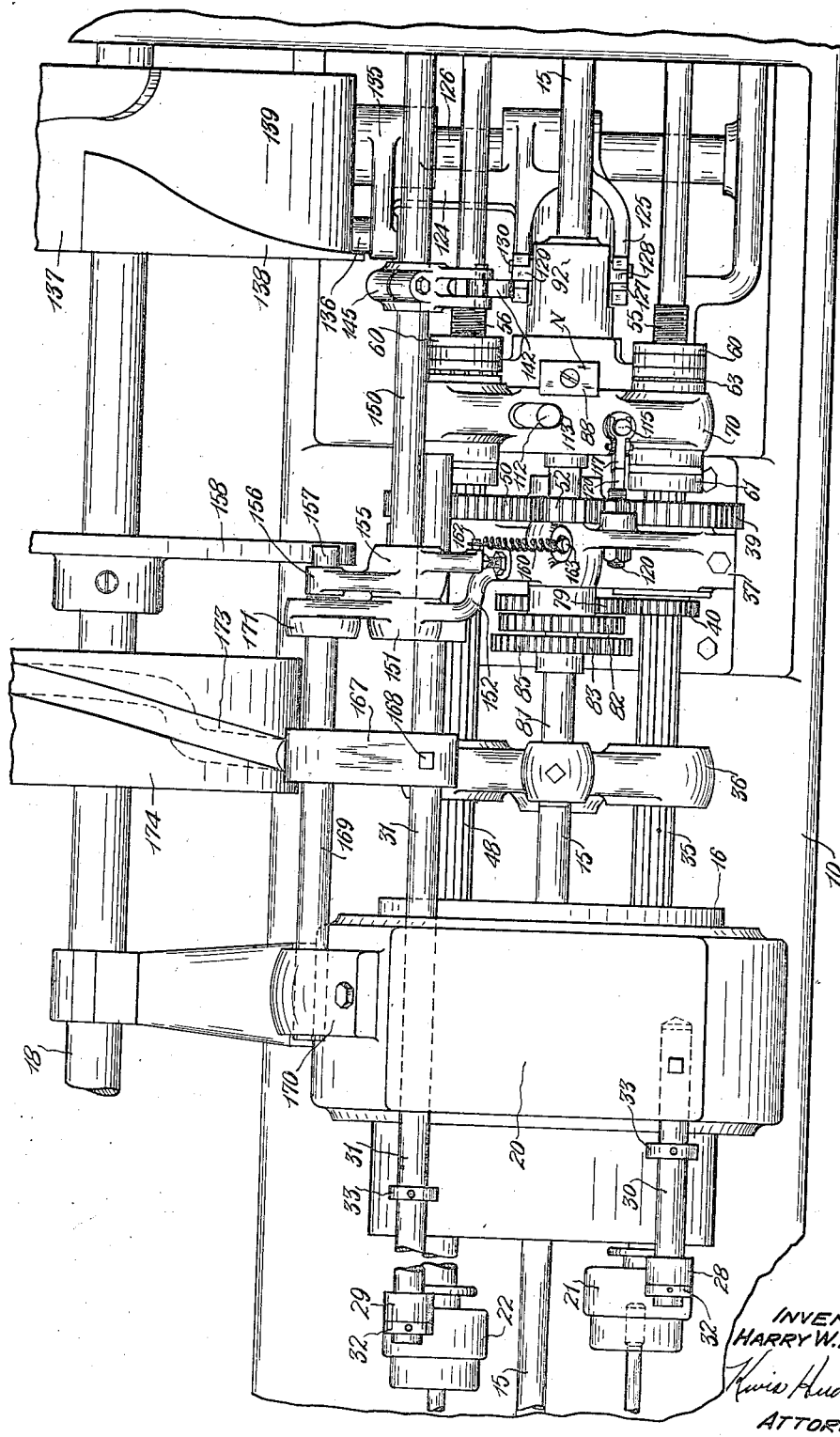
Fig. 2 is a plan of the portion of the machine illustrated in Fig. 1.

In order to accomplish the above results the shaft 31, which carries the stops 32 and 33 adapted to operate the rear die 22, is slidably supported in the spindle head 20 and a suitable boss in the bracket 37, and is adapted to be operated in predetermined timed relation to the other operations of the machine. A member 167 fixed to the shaft 31 by a set screw 168 and slidably supported by a shaft 169, fixed in a bracket 170 bolted or otherwise secured to the tool head 20 and a boss 171 formed on the rearward projection 152 of the bracket 37, carries a cam roller 172 adapted to engage in a cam track 173 in a cam drum 174 on the cam shaft 18. The operation of the mechanism just described is such that when the die 22 reaches its forward position it is opened by the engagement of the yoke 29 with the forward stop 32. During the return movement of the die 22 the shaft 31 is also moved towards the right, as viewed in Figs. 1 and 2 so that the yoke member 29 will not engage the rear stop 33. During the forward traverse movement of the die 22 the shaft 31 is moved in the same direction, that is towards the left, as viewed in the above mentioned figures, and after the die has moved over the first or forward threads $x$, that is those threads cut by die 21, the movement of the shaft 31 is accelerated until the rear stop 33 engages the yoke 29, moves the same forward and closes the die 22. The reduced section of the work W, in the present instance a stay bolt, is preferably formed in the lower front station by a conventional turning tool 180 carried on the front cross slide 181.

During the reciprocation of the dies 21 and 22 towards and from the spindle head, the main tool slide 16 is also reciprocated in the same direction in predetermined timed relation thereto, by mechanism well known in the art. The tool slide 16 is reciprocated in such a manner that it reaches its forward position at the same time the dies reach their forward positions and thereby reduces the overhang of the dies.

Figure 3:
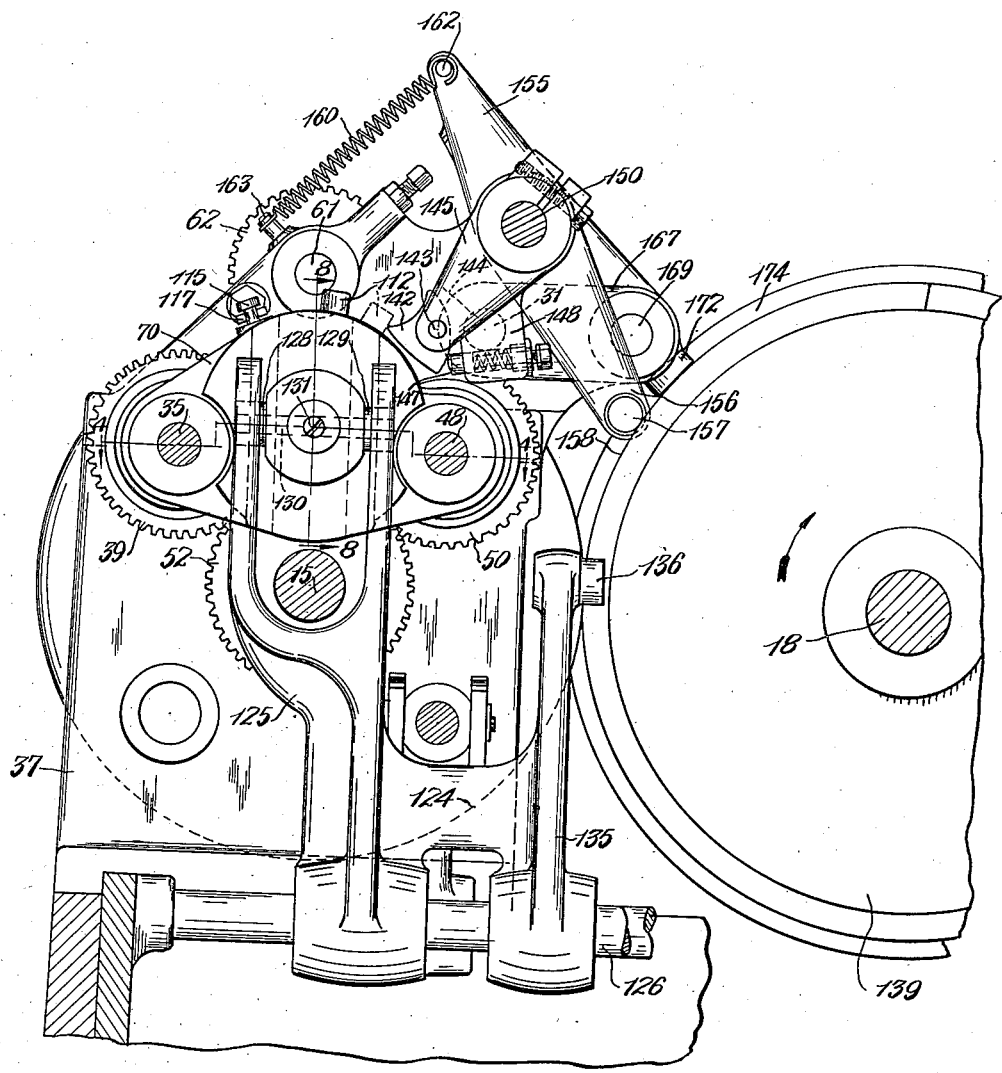
Fig. 3 is a section on the line 3—3 of Fig. 1.

The operation of the machine which will be apparent from the above description, is as follows: The work in the form of rod stock is fed through the continuously rotating work spindles preferably in the rear lower station after the cutting off operation, and the reduced central section of the work blank turned by the tool 180 in the front lower station, the turret indexing in a clockwise direction as viewed in Fig. 3. It will be understood that other operations may be performed in either or both of these stations depending upon the character of the particular article being formed.

While the operations referred to above are being performed in the lower station, the thread $x$ is being cut in the upper front station by the die 21 upon the work in that station at that time, and the thread $y$ is being cut in the upper rear station by the die 22 upon the work in that station. During the indexing operation the tool slide 16, and the dies 21 and 22 are in their retracted position, that is at the right-hand end, as viewed in Figs. 1 and 2, of their movement towards and from the spindle turret with the die 21 closed, and the split nut N and die 22 open. The initial movement towards the spindle turret comprises a rapid traverse movement under the action of the member 124 and the cam drum 139, to move the die 22 over thread $x$ cut in the preceding station, and the the reduced section of the blank, during which time the lost motion connection between the tubular member 23 and the shaft 35 is taken up, and the die 21 brought to its working position if the same is required by the nature of the work.

During the above mentioned rapid traverse movement of the dies to working position the shaft 31 is advanced under operation of the cam drum 174 and the die 22 closed after the same has cleared the thread $x$. The dies are now in a position to engage the work and the split nut N is closed about the lead screw 75 to start the feed, by the engagement of the pawl 142 with the pin 112 under the action of the face cam 158, and the cam roller 136 runs off the cam plate 137. At the end of the forward or feed movement the split nut N is opened by the engagement of the lever 119 with the stop 120, and both dies are opened by the front stops 32. The dies are retracted to their right-hand position as viewed in Figs. 1 and 2, by a rapid traverse movement under the action of the cam rollers 136 and the cam plate 137. During the reverse movement of the dies the shaft 31 is moved in the same direction thus preventing engagement of the yoke member 29 with the rear stop 33 and closing of the die 22. As the die 22 reaches the end of its reverse movement it is closed by the engagement of the yoke member 29 with the rear stop 33. During the entire operation of the machine the movement of the main tool slide 16 preferably follows that of the front die 21 thus keeping the overhang of the dies at a minimum. The lever 145 is adjustable along the shaft 150, the stop 120 in the bracket 37, the stops 32 and 33 on the shafts 30 and 31, and the lead screw 75, together with the various cams etc. to permit the machine to be set up for work of different character.

Heretofore it was customary to produce spaced threads on an article such as that illustrated by threading the entire length of the blank and then reducing the section of the blank between the desired threads. The threading operation was performed entirely in one station which required a considerable length of time with a resulting low production. In the present invention the threading operations are being performed simultaneously in a plurality of stations thereby reducing the time in any one station and increasing the production of the machine. In producing the article illustrated the time is reduced to about one-fifth of that originally required, as the feed of the dies has been reduced from the full length of the blank to that of one threaded section.

From the foregoing description of the preferred embodiment of the invention illustrated it will be apparent that the objects of the invention have been attained, and that a simple, accurate, rigid, compact machine has been provided for producing spaced threads etc. upon blanks, which is automatic, has a very low operating time in each station, and a high production.

The preferred embodiment of the invention has been illustrated and described but I do not wish to be limited to the particular construction shown, which may be varied within the scope of this invention, and I particularly point out and claim as my invention the following:

1. In an automatic machine tool the combination of an indexible turret, a plurality of work chucks carried by said turret, means for intermittently rotating said turret whereby said chucks are indexed through a plurality of tool stations, a tool slide adapted to be moved towards and from said spindle turret, a movable member adapted to be reciprocated towards and from said chucks, a plurality of threading tools positioned at different tool stations, main support operatively connecting said threading tools to said member for movement therewith, and means for reciprocating said member towards and from said chucks independent of the movement of said tool slide in predetermined timed relation to the other operations of the machine.

2. In an automatic machine tool the combination of an indexible turret, a plurality of chucks carried by said turret, means for intermittently rotating said turret whereby said spindles are indexed through a plurality of tool stations, a movable member adapted to be reciprocated towards and from said chucks, a plurality of threading tools rotated at different tool stations and operatively connected to said movable member, and means for reciprocating said member towards and from said turret in predetermined timed relation to the indexing of said turret, said means comprising a lead screw and a cooperating split nut.

3. In an automatic machine tool the combination of an indexible spindle turret, a plurality of spindles adapted to have work fed through the center thereof rotatably supported in said spindle turret, a movable member adapted to be reciprocated towards and from said spindles, a plurality of threading tools operatively connected to said movable members and supported in alignment with said spindles, a lead screw supported adjacent said member, a split nut supported by said member adapted to operatively connect and disconnect said member with said lead screw, means for opening and closing said split nut, and means for producing relative rotation between said lead screw and said split nut.

4. In an automatic machine tool the combination of an indexible spindle turret, a plurality of chucks carried by said turret, a movable member adapted to be reciprocated towards and from said chucks, a plurality of threading tools operatively connected to said member and supported in alignment with said chucks, means for reciprocating said member whereby said tools are moved towards said chuck, and means for retarding the movement of one of said tools during the initial movement of said member towards said chucks.

5. In an automatic machine tool the combination of an indexible spindle turret, a plurality of spindles adapted to have work fed through the center thereof rotatably supported in said spindle turret, a movable member adapted to be reciprocated towards and from said spindles, a plurality of threading tools operatively connected to said movable members and supported in alignment with said spindles, means for reciprocating said members whereby said tools are moved towards said chuck, and means for retarding the movement of one of said tools during the initial movement of said members towards said chucks.

6. In an automatic machine tool the combination of an indexible spindle turret, a plurality of spindles adapted to have work fed through the center thereof rotatably supported in said spindle turret, a movable member adapted to be reciprocated towards and from said spindles, a plurality of threading tools operatively connected to said movable members and supported in alignment with said spindles, a lead screw supported adjacent said member, a split nut supported by said member adapted to operatively connect and disconnect said member with said lead screw, means for opening and closing said split nut, means for producing relative rotation between said lead screw and said split nut, whereby said tools are moved towards said chucks, and means for retarding the movement of one of said tools during the initial movement of said member towards said chucks 7. In an automatic machine tool of the character described the combination of an indexible spindle turret, a plurality of chucks carried by said spindle turret, a movable member adapted to be reciprocated towards and from said chucks, a plurality of collapsible tools operatively connected to said member, means for reciprocating said member whereby said tools are moved towards and from said chucks, and means for closing said tools at different points in their cycle of movement towards and from said chucks.

8. In an automatic machine tool of the character described the combination of an indexible spindle turret, a plurality of chucks carried by said turret, a movable member adapted to be reciprocated towards and from said chucks, a plurality of collapsible dies operatively connected to said member and supported in alignment with said chucks, means for reciprocating said member whereby said dies are moved towards and from said chucks, and means for closing said dies at different points in their cycle of movement towards and from said chucks.

9. In an automatic machine tool the combination of an indexible spindle turret, a plurality of spindles adapted to have work fed through the center thereof rotatably supported by said spindle turret, means for intermittently rotating said turret whereby said spindles are indexed through a plurality of tool stations, a main tool slide slidably supported in alignment with said turret and movable towards and from the same in predetermined timed relation to the indexing of said turret, a plurality of collapsible threading dies located at different tool stations, a member operatively connected to said collapsible threading dies, means for reciprocating said member whereby said dies are moved towards and from said turret, means for retarding the movement of one of said collapsible threading dies during the initial movement of said member towards said turret, and means for opening and closing said collapsible threading dies at different points in their cycle of movement towards and from said turret.

HARRY W. RUPPLE.